March 9, 1948. R. E. BROWN 2,437,592
DUST SEPARATOR AND FILTER
Filed Jan. 8, 1945
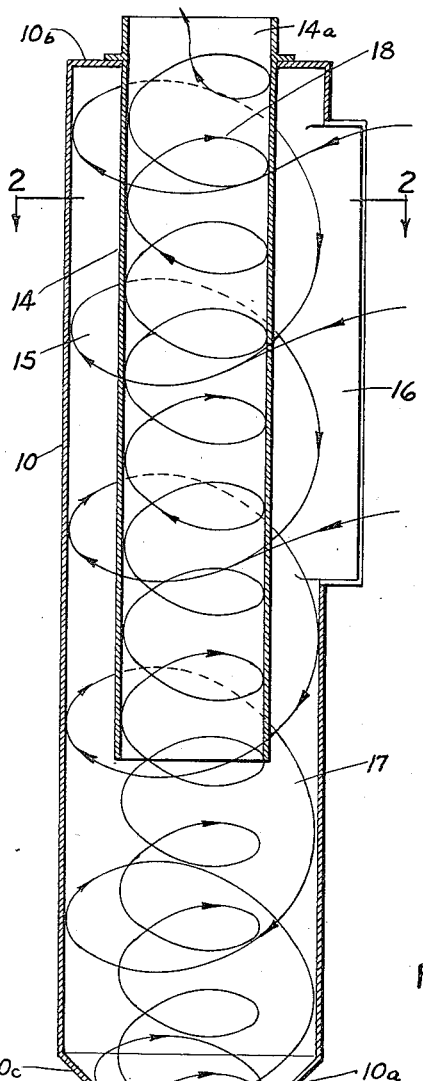
FIG. 1.
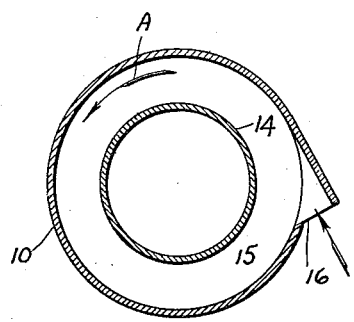
FIG. 2.
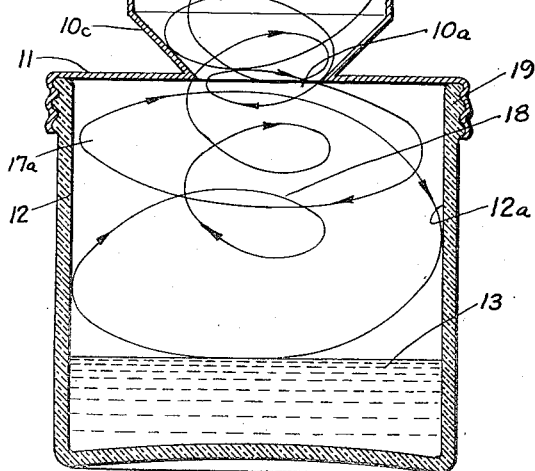
INVENTOR
RICHARD E. BROWN
By Hyde and Meyer
ATTORNEYS.

Patented Mar. 9, 1948

2,437,592

UNITED STATES PATENT OFFICE 2,437,592

DUST SEPARATOR AND FILTER

Richard E. Brown, South Euclid, Ohio, assignor to Air-Maze Corporation, Cleveland, Ohio, a corporation of Delaware Application January 8, 1945, Serial No. 571,767

2 Claims. (Cl. 183—21)

This invention relates to improved means for separating dust from a gaseous stream and relates particularly to dust separators of the vortex-chamber type.

One of the objects of the present invention is to thoroughly mix a dust-bearing gaseous stream with an adhesive liquid such as oil or the like while the gas is swirling in the vortex so as to more efficiently eliminate the dust from the stream. Other objects and advantages of the invention will be apparent from the accompanying drawings and specification, and the essential features thereof will be set forth in the claims.

In the drawings,

Fig. 1 is a central vertical section through one form of my device; while

Fig. 2 is a transverse sectional view of the same taken along the line 2—2 of Fig. 1.

The large cylindrical tube 10 is open at the bottom as indicated at 10a and is there provided with the attached cover member 11 which is adapted to have a threaded connection with a liquid reservoir 12. In this reservoir is a pool of liquid 13 adapted to act as a dust adhesive. As is well known in this art, oil, glycerine and other materials are well known for this purpose. Entering at the top of tube 10 and extending downwardly therein is the smaller cylindrical tube 14 which is open top and bottom and provides an annular gas inlet chamber 15 between the tubes 10 and 14. The top of this annular chamber is sealed as indicated at 10b and gas inlet means is provided as indicated at 16, the same being so arranged that the incoming gas stream is given a whirling motion within the annular chamber 15 in the direction of the arrow A indicated in Fig. 2. While only one gas inlet has been shown, it is obvious that more may be provided if necessary. Preferably, the lower end of tube 14 is below the bottom of the inlet opening 16 as clearly seen in Fig. 1. The lower portion of tube 10 beneath tube 14 provides a vortex chamber where the whirling gas stream throws the dust outwardly to the cylindrical walls, and the dust passes downwardly along these walls to a receiving chamber below tube 10.

The principle of the flow of the gas stream is illustrated diagrammatically in Fig. 1 by means of the spiral curves there indicated. The gaseous stream entering at 16 follows the larger spiral curve 17 near the walls of the tube 10. This spiral travels downwardly as indicated by the arrows on the curve 17 to the bottom of tube 10 where the spiral is constricted to pass through the narrow opening 10a. My device will operate without this narrow constriction at this point, but I find the efficiency of my device is increased by forming the frusto-conical wall at 10c at the bottom of tube 10 so as the converge the walls gradually to the relatively small opening 10a. After passing through the opening 10a, the whirling stream again expands as indicated by the curve 17a and travels downwardly until it strikes the liquid 13. Some of this liquid is picked up by the stream and thrown against the walls 12a of the liquid reservoir thoroughly coating the walls and causing the dust to adhere thereto. The gas stream then begins to move upwardly along the smaller spiral curve 18 and continues in the path through the center of tubes 10 and 14 until it finally is discharged at the outlet 14a. This stream in passing upwardly through the opening 10a carries some of the liquid from the pool 13 up into the tube 10, and I find that the walls of the tube become coated with the liquid up to a point level with the bottom of tube 14. This coating on the inner walls of the lower portion of tube 10 aids greatly in increasing the efficiency of my device. I believe this increase in efficiency is due to the fact that the dust particles in the gaseous stream are caused to adhere to the liquid-coated wall of tube 10, and the dust is carried downward by the liquid returning to the reservoir 12. This action is continuous so long as a gaseous stream is passing through my device. In other words, it appears that some of the liquid 13 is continuously being carried up into the lower portion of tube 10 where it washes down along the walls and carries the dust particles into the liquid pool in the bottom of the reservoir 12. Also, where the liquid draining from the edges of the opening 10a and dropping toward the pool 13, there is provided an intimate mixture between the liquid and the dust-bearing gaseous stream. It will be noted that an easily detachable connection as indicated by the threads 19 is provided between the liquid reservoir 12 and the flange 11 connected with the bottom of tube 10. It is thus easy to remove the liquid reservoir for the purpose of emptying the dirty liquid and replenishing the same with clean liquid. It will be understood by those skilled in this art that the outlet 14a is generally permanently connected to some conduit through which the clean gas stream is intended to flow and that either a source of suction is connected with 14a or the gas entering at 16 is under a pressure for the purpose of inducing the flow above described. In such a case, it is obviously an advantage to be able to renew the liquid 13 without disturbing the conduit connections to the tube 10 or 14.

What I claim is:

1. Means for separating dust from a stream of gas comprising a cylindrical tube open at the bottom, a second cylindrical tube extending within and downwardly from the top of said first tube to provide an annular inlet chamber, there being a space in said first tube beneath the lower end of said second tube providing a vortex chamber there, there being a gas inlet opening leading into said annular chamber, said second tube having an open bottom and top whereby a gas outlet is provided at the top thereof, and a liquid-containing reservoir in closed communication with the open bottom of said first tube, whereby the gas stream is given a whirling motion in said annular and vortex chambers causing liquid in said reservoir to be mixed with said gas and thrown against the walls of said reservoir and said vortex chamber to increase the dust separating action of said means.

2. The combination of claim 1 including a converging passageway leading from said vortex chamber into said reservoir compelling intimate mixture of gas-borne dust and liquid.

RICHARD E. BROWN.

REFERENCES CITED

The following references are of record in the file of this patent:

UNITED STATES PATENTS

| Number | Name | Date |
|---|---|---|
| 844,312 | Bachman | Feb. 19, 1907 |
| 1,323,816 | Bennett | Dec. 2, 1919 |
| 1,513,035 | Donaldson | Oct. 28, 1924 |
| 1,818,742 | Paradise | Aug. 11, 1931 |
| 2,085,506 | McKeown | June 29, 1937 |
| 2,152,114 | Van Tangeren | Mar. 28, 1939 |